US012771433B2

(12) United States Patent
Raghavan et al.

(10) Patent No.: US 12,771,433 B2
(45) Date of Patent: Oct. 20, 2026

(54) METHODS FOR ON-DEMAND BEAM TRAINING WITH MECHANICALLY MOVEABLE PANELS

(71) Applicant: QUALCOMM Incorporated, San Diego, CA (US)

(72) Inventors: Vasanthan Raghavan, West Windsor Township, NJ (US); Junyi Li, Greentown, PA (US); Jung Ho Ryu, Englewood Cliffs, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 19/018,826

(22) Filed: Jan. 13, 2025

(65) Prior Publication Data

US 2026/0205190 A1 Jul. 16, 2026

(51) Int. Cl.
*H04B 7/06* (2006.01)
*H04W 28/02* (2009.01)

(52) U.S. Cl.
CPC .... *H04B 7/06966* (2023.05); *H04W 28/0215* (2013.01); *H04W 28/0226* (2013.01)

(58) Field of Classification Search
CPC .......... H04B 7/06966; H04W 28/0215; H04W 28/0226
See application file for complete search history.

(56) References Cited

U.S. PATENT DOCUMENTS

2018/0062719 A1* 3/2018 Verma .................. H04W 72/51
2022/0116083 A1* 4/2022 Zhou .................... H04B 7/0404
2023/0057661 A1 2/2023 Awoniyi-Oteri et al.
2024/0405811 A1* 12/2024 Huang .................. H04B 7/088

OTHER PUBLICATIONS

Partial International Search Report—PCT/US2025/057728—ISA/EPO—Mar. 18, 2026.
International Search Report and Written Opinion—PCT/US2025/057728—ISA/EPO—May 11, 2026.

* cited by examiner

*Primary Examiner* — Sung S Ahn
(74) *Attorney, Agent, or Firm* — Procopio, Cory, Hargreaves & Savitch LLP

(57) ABSTRACT

A method for wireless communication at a user equipment (UE) and related apparatus are provided. In the method, the UE transmits a request for a beam training session to a network entity in response to a displacement condition being met. The displacement condition is associated with a relative movement of the first antenna panel of the UE with respect to the second antenna panel of the UE. The UE then performs the beam training session with the network entity based on the request.

20 Claims, 12 Drawing Sheets

METHODS FOR ON-DEMAND BEAM TRAINING WITH MECHANICALLY MOVEABLE PANELS

TECHNICAL FIELD

The present disclosure relates generally to communication systems and, more particularly, to beam training mechanisms for wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor may be configured to transmit, to a network entity, a request for a beam training session in response to a displacement condition being met, where the displacement condition is associated with a relative movement of the first antenna panel of the UE with respect to the second antenna panel of the UE; and perform the beam training session with the network entity based on the request.

In an aspect of the disclosure, a method, a computer-readable medium, and an apparatus are provided for wireless communication at a network entity. The apparatus may include at least one memory and at least one processor coupled to the at least one memory. Based at least in part on information stored in the at least one memory, the at least one processor may be configured to receive, from a UE, a request for a beam training session in response to a displacement condition being met, where the displacement condition is associated with a relative movement of the first antenna panel of the UE with respect to the second antenna panel of the UE; and perform the beam training session with the UE based on the request.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
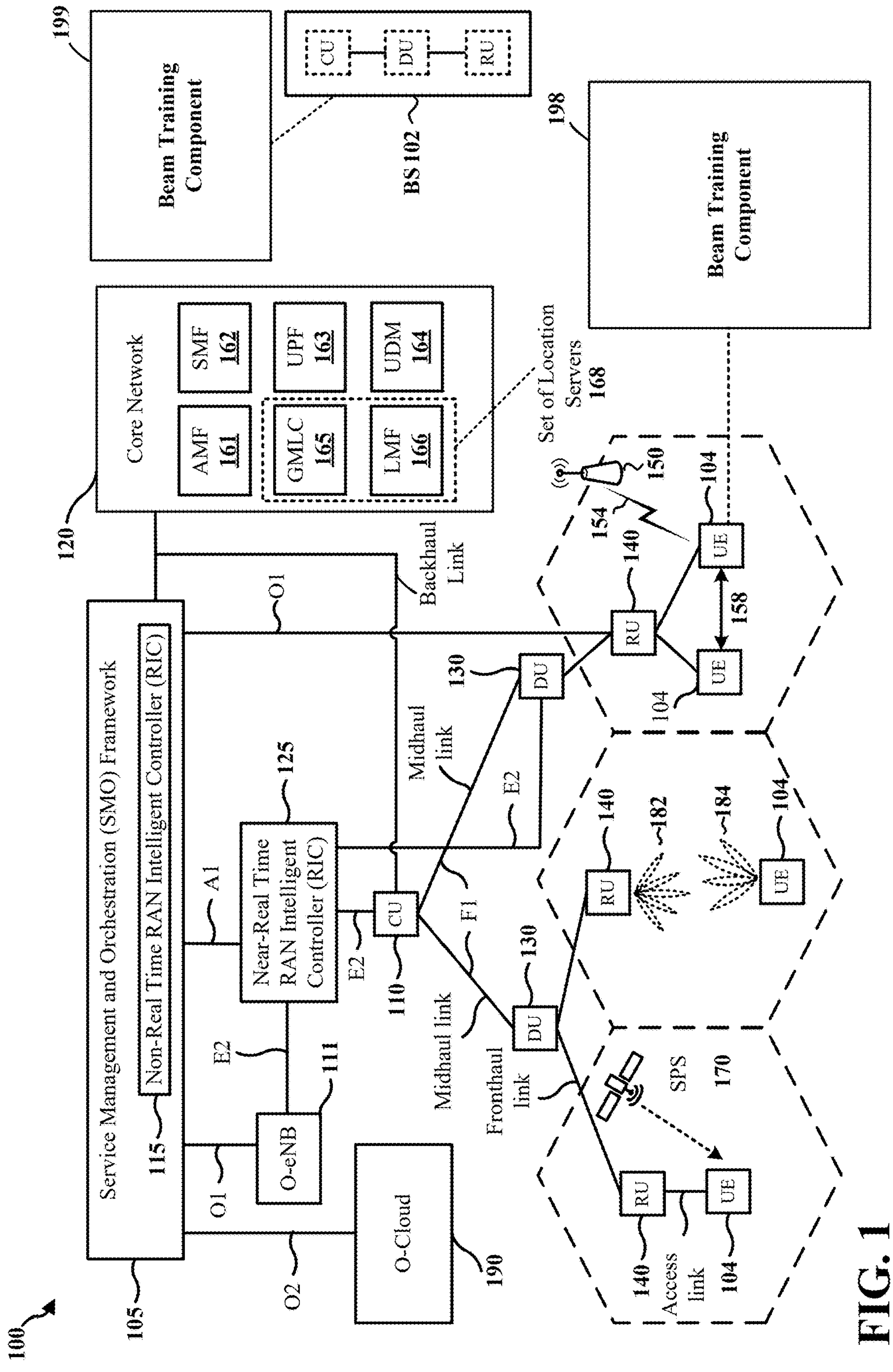
FIG. 1 is a diagram illustrating an example of a wireless communication system and an access network.

In wireless communication, a wireless device (or a user equipment (UE)) may have mechanically moveable antenna panels or antenna modules, which may introduce uncertainty in their location relative to a base station. This uncertainty presents significant challenges in maintaining the beam quality of wireless communications. For example, eXtended Reality (XR) devices with fixed or displaceable antenna panels may experience location uncertainty due to overall device movement or intra-device mobility. Similarly, low-cost customer premises equipment (CPE) with moveable antenna panels may experience panel uncertainty resulting from motor stability issues or degradation in motor health. Such uncertainties in antenna location may negatively impact communications quality. In these scenarios, while the device (or UE) may not have precise real-time knowledge of the position of its antenna panels, it can detect mechanical displacement of the panels that exceeds a configured threshold distance. Example aspects presented herein provide methods and apparatuses for UE-initiated beam management based on a new triggering event of antenna/panel displacement being above the threshold distance. Example aspects cover details of beam dimensions (a full set of beams or a subset of beams) and the UE's reporting of antenna locations.

Various aspects relate generally to wireless communication. Some aspects more specifically relate to UE-initiated beam training for wireless communication. In some examples, a UE transmits a request for a beam training session to a network entity when a displacement condition is met. The displacement condition is associated with a relative movement of the first antenna panel of the UE with respect to the second antenna panel of the UE. The UE then performs the beam training session with the network entity based on the request. In some aspects, the displacement condition being met may indicate that the relative movement of the first antenna panel with respect to the second antenna panel is greater than a distance threshold, and the UE may receive a threshold distance configuration indicative of the distance threshold from the network entity. In some aspects, when performing the beam training session, the UE may perform the beam training session with a full set of beams of the network entity if no location range of the first antenna panel or the second antenna panel is provided to the network entity. On the other hand, the UE may indicate the location range of the first antenna panel or the second antenna panel to the UE, and the UE may perform the beam training session with the network entity using a subset of beams covering the location range.

Particular aspects of the subject matter described in this disclosure can be implemented to realize one or more of the following potential advantages. In some examples, by providing an efficient and adaptive solution for UE-initiated on-demand beam training for devices with mechanically movable antenna panels, the described techniques address the uncertainties associated with antenna panel positioning and user mobility, thereby enhancing communication reliability. In some examples, by enabling the UE to signal potential location ranges of antenna panels and thereby narrowing the beam search space for the base station, the described techniques reduce the computational overhead and time needed for beam training sessions, improving the overall efficiency of wireless communication. In some aspects, by allowing UE to store and utilize historical beam training data, the described techniques reduce redundancy and further optimize the beam training process.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include the beam training component 198. The beam training component 198 may be configured to transmit, to a network entity, a request for a beam training session in response to a displacement condition being met, where the displacement condition is associated with a relative movement of the first antenna panel of the UE with respect to the second antenna panel of the UE; and perform the beam training session with the network entity based on the request. In certain aspects, the base station 102 may include the beam training component 199. The beam training component 199 may be configured to receive, from a UE, a request for a beam training session in response to a displacement condition being met, where the displacement condition is associated with a relative movement of the first antenna panel of the UE with respect to the second antenna panel of the UE; and perform the beam training session with the UE based on the request. Although the following description may be focused on 5G NR, the concepts described herein may be applicable to other similar areas, such as LTE, LTE-A, CDMA, GSM, and other wireless technologies.

Figures 2A, 2B, 2C, 2D:
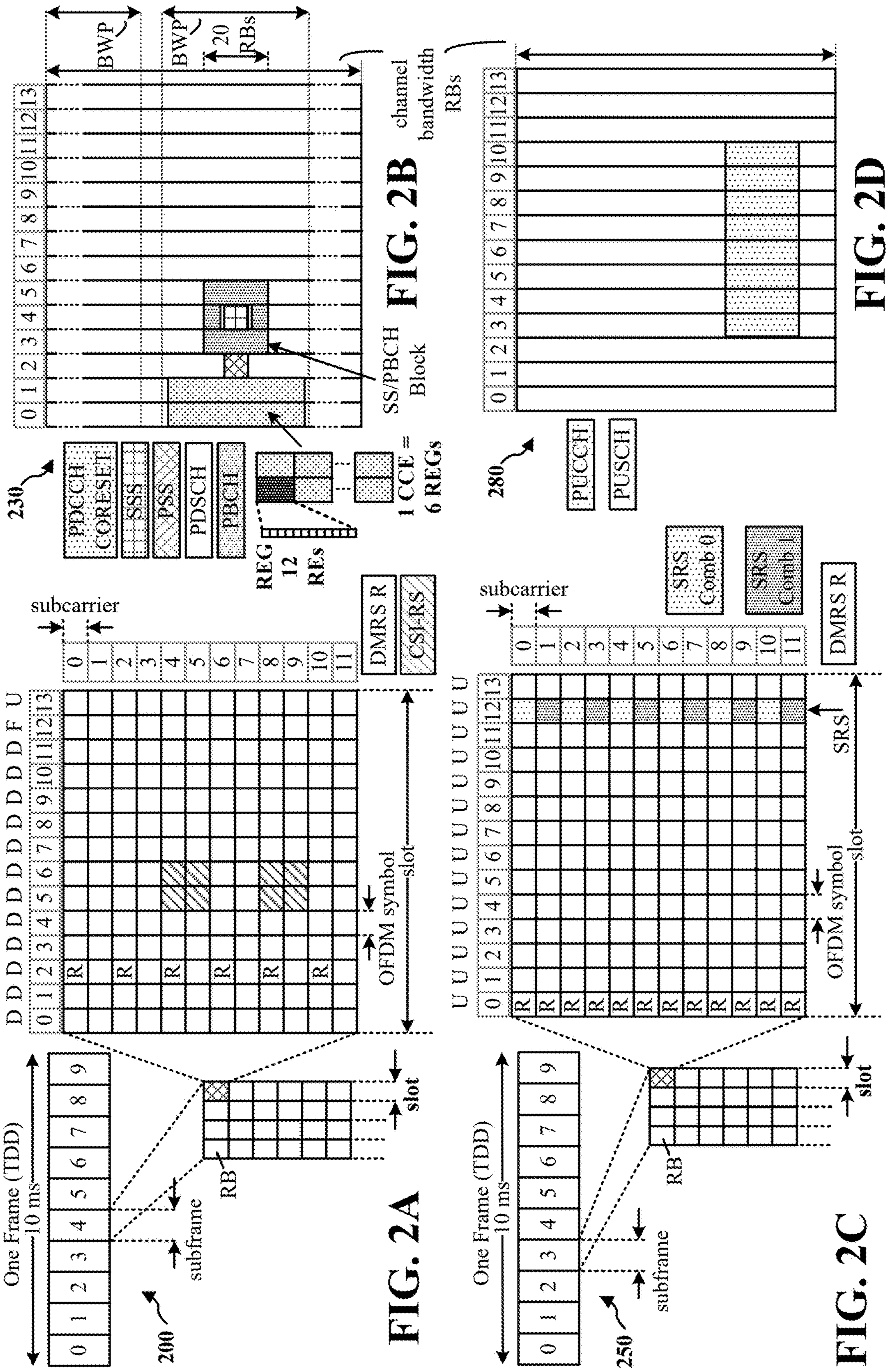
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
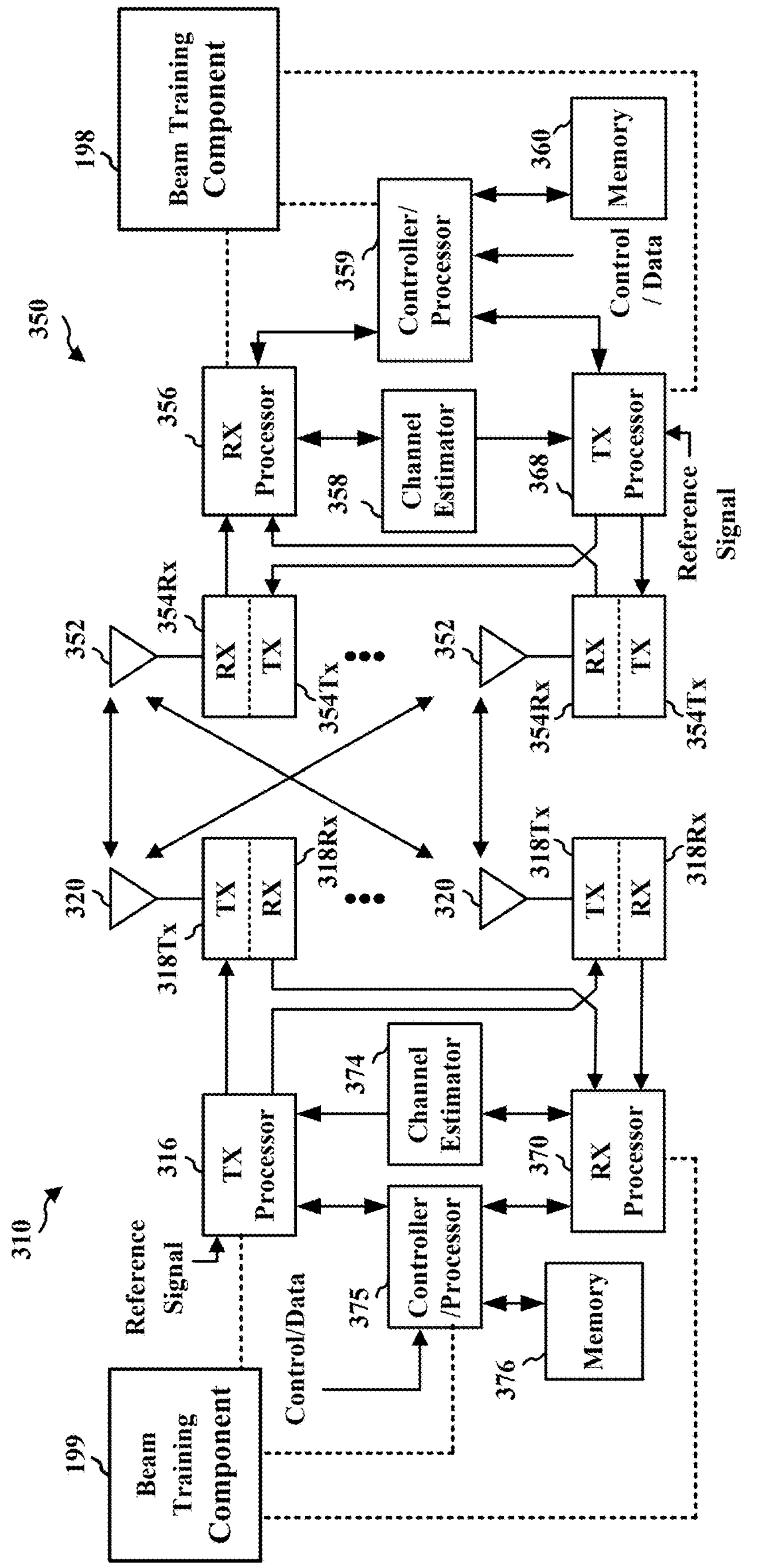
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam training component 198 of FIG. 1.

At least one of the TX processor 316, the RX processor 370, and the controller/processor 375 may be configured to perform aspects in connection with the beam training component 199 of FIG. 1.

In wireless communication, a wireless device (or UE) may have mechanically moveable antenna panels or antenna modules, which may introduce uncertainty in their location relative to a base station. This uncertainty presents significant challenges in maintaining the beam quality of wireless communication. For example, XR devices with fixed or displaceable antenna panels may experience location uncertainty due to overall device movement or intra-device mobility (e.g., the movement of one antenna panel relative to another antenna panel within the device). Similarly, low-cost CPE with moveable antenna panels may experience panel uncertainty resulting from motor stability issues or degradation in motor health. Such uncertainties in antenna location may negatively impact communication quality. In these scenarios, while the device (or UE) may not have precise real-time knowledge of the position of its antenna panels, it can detect mechanical displacement of the panels that exceeds a configured threshold distance. Example aspects presented herein provide methods and apparatuses for UE-initiated beam management based on a new triggering event of antenna/panel displacement being above the threshold distance. Example aspects cover details of beam dimensions (a full set of beams or a subset of beams) and the UE's reporting of antenna locations.

Figure 4:
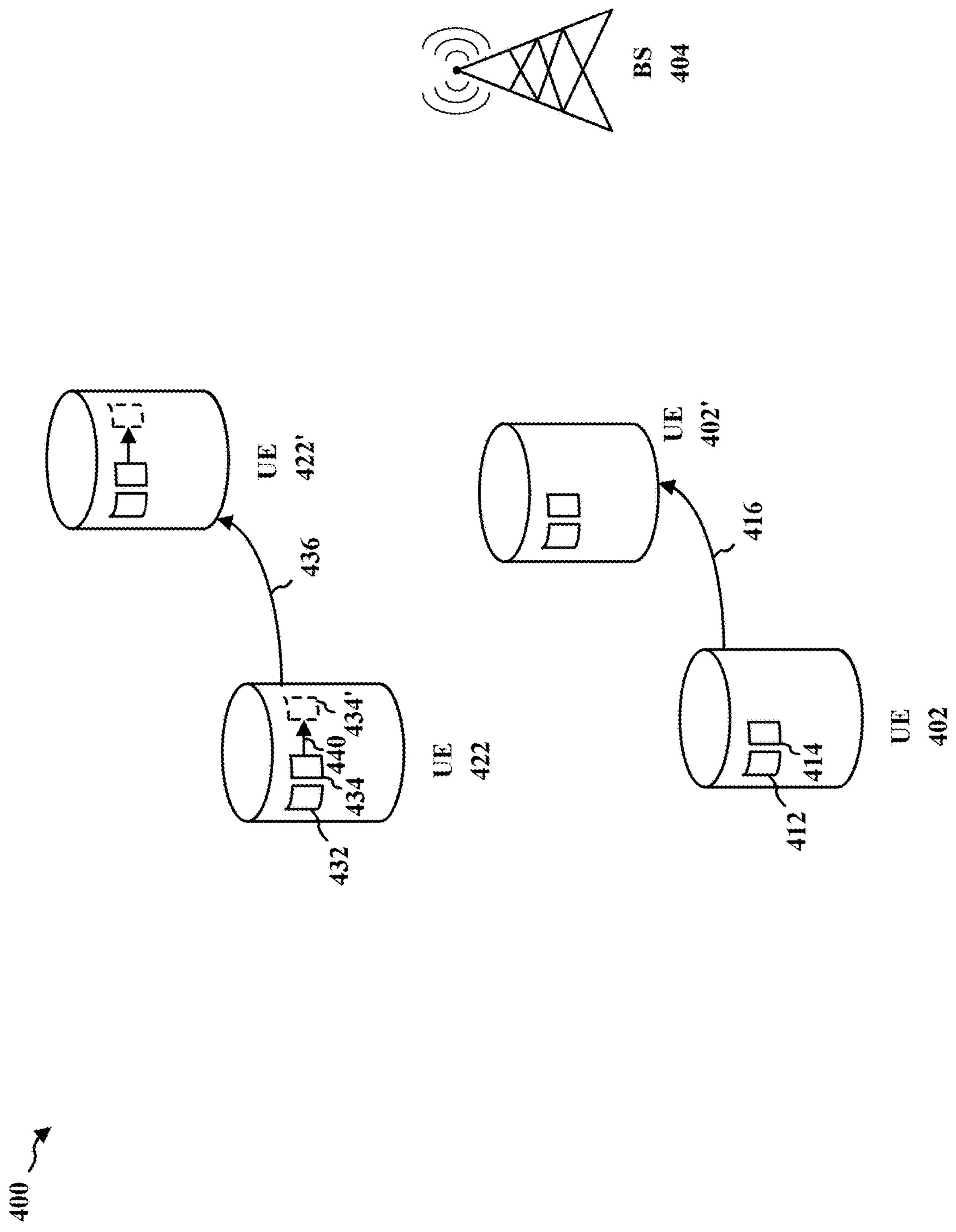
FIG. 4 is a diagram illustrating examples of the movements of antenna panels of a wireless device or UE.

In wireless communication, the development of applications in the FR2 frequency range introduces various scenarios where antenna panels or modules of a wireless device (or UE) may have an associated uncertainty in their location relative to a base station. FIG. 4 is a diagram 400 illustrating examples of the movements of antenna panels of a wireless device or UE. As shown in FIG. 4, the movements of the antenna panels may include several use cases. In some examples involving augmented reality (AR), virtual reality (VR), or extended reality (XR) applications, a device with fixed antenna panels, such as UE 402 with fixed antenna panels 412, 414, may face uncertainty in its location due to device mobility (e.g., the movement 416 of UE 402 to 402'), even though the panels themselves (e.g., antenna panel 412, 414) are stationary with respect to the devices (e.g., UE 402). In some examples involving AR, VR, or XR applications, a device with displaceable (or moveable) antenna panels, such as UE 422 with displaceable (or moveable) antenna panels 432, 434, introduces additional complexities, as both intra-device mobility (e.g., the movement 440 of one antenna panel 434 with respect to another antenna panel 432) and overall device movement (e.g., the movement 436 of UE 422 to 422') relative to the base station (e.g., base station 404) contribute to positional uncertainty. In some examples, low-cost customer premises equipment (CPE) with moveable antenna panels may experience panel uncertainty arising from motor stability issues or degradation in motor health.

In these use-cases, while the device may not have precise knowledge of the instantaneous position of its antenna panels (e.g., antenna panel 412, 414, 432, 434), it can still identify mechanical displacement of the antenna panels or intra-device mobility (e.g., the movement 440 of the antenna panel 434 with respect to antenna panel 432) that exceeds a configured threshold distance, thereby enabling corresponding adjustments. In some examples, sensors may be used to detect intra-device mobility (e.g., the movement of 440 of antenna panel 434 to 434') and also the mobility of the entire device relative to the base station, such as the movement 416 of UE 402 or movement 436 of UE 422 relative to base station 404. Example aspects presented herein provide methods and apparatuses for on-demand beam management in these scenarios based on the movements of the antenna panels (e.g., intra-device movement 440).

In some aspects, millimeter wave devices have been deployed in various applications. The carrier frequencies for millimeter wave devices may include, for example, the 28 GHz, 39 GHz, and 48 GHz bands, and there is increasing focus on upper millimeter wave bands exceeding 52.6 GHz and sub-terahertz bands beyond 114.25 GHz. These frequency ranges are frequently used for vehicular applications and AR, VR, or XR applications. In many of these applications, user mobility (e.g., the movement 416, 440) may need to be addressed, particularly in relation to beam training.

Figure 5:
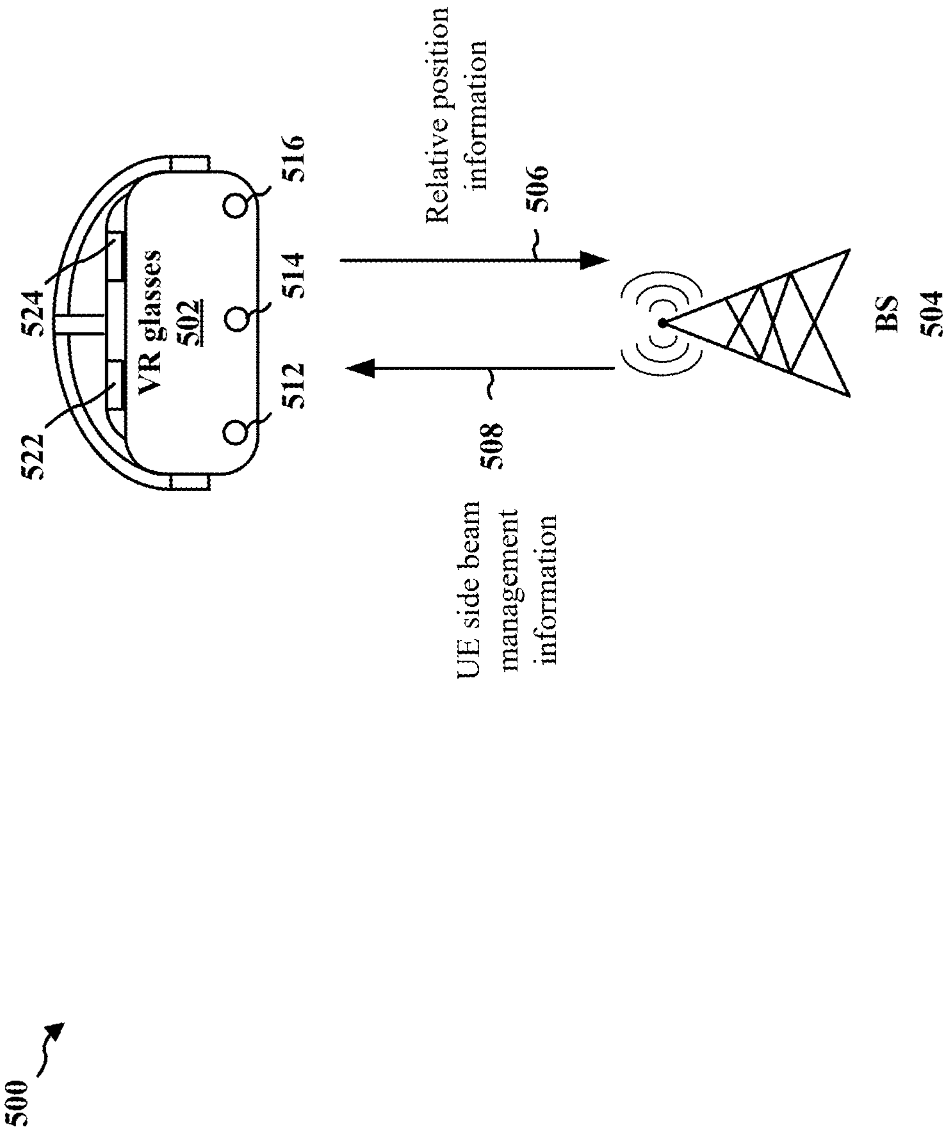
FIG. 5 is a diagram illustrating an example of a device that include multiple antenna panels and sensors.

In some examples, devices in these scenarios may have multiple antenna arrays, panels, or modules that are fixed in specific locations. The positions of these antenna panels may be known to the device management module. To manage the device's relative position to the base station during user movement, the device may have multiple internal sensors, including cameras, gyroscopes, and accelerometers, to provide information that can be used to determine the device's relative position to the base station or, in some examples, predict user movements. FIG. 5 is a diagram 500 illustrating an example of a device that includes multiple antenna panels and sensors. In this example, VR glasses 502 is used as an example to demonstrate the operations of such devices. As shown in FIG. 5, VR glasses 502 may have multiple antenna panels, such as antenna panels 522, 524. To manage the device's relative position to the base station 504 during user movement, including the relative movement between the antenna panels 522 and 524, VR glasses 502 may have multiple internal sensors, such as sensor 512, 514, 516, to provide relative position information that can be used to determine the device's relative position to the base station 504. The VR glasses 502 may provide the relative position information to base station 504 at 506, and the base station 504 may provide UE side beam management information to VR glasses 502 at 508.

Based on the fixed positions of the antenna panel and internal sensor data, the UE (e.g., VR glasses 502) may assist with pose prediction and corresponding beam management. This may include techniques such as beam switching from a codebook, transitioning from codebook-based beamforming to adaptive beam weight-based beamforming, or beamwidth adaptation.

Figure 6:
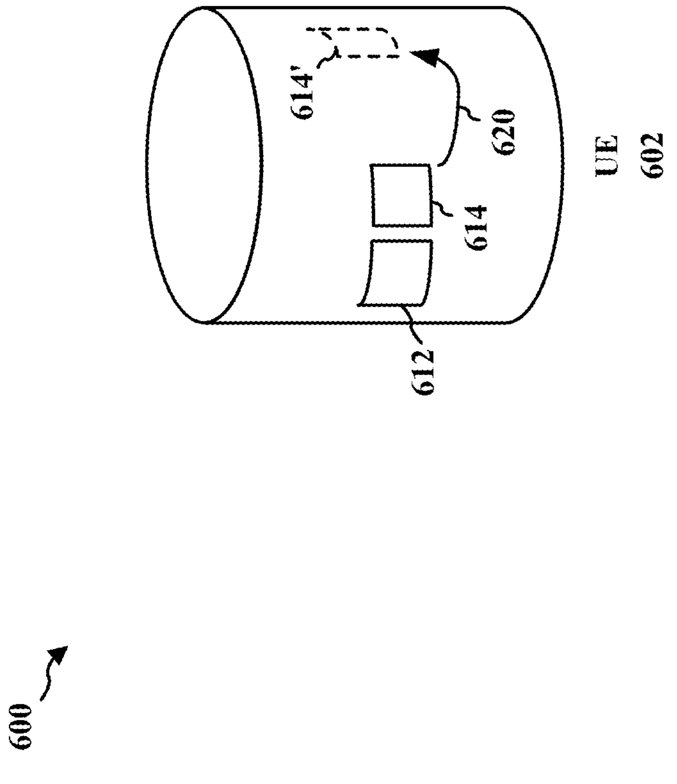
FIG. 6 is a diagram illustrating an example of a wireless device with mechanically displaceable (or movable) antenna panels in accordance with various aspects of the present disclosure.

Many wireless devices, including the devices operating in the FR2 frequency range, include antenna panels that are mechanically displaceable (or movable). These panels can be displaced either linearly along two dimensions or through rotational movements. As an example, a low-cost device may have mechanically displaceable (or movable) antenna panels that may achieve comparable effective isotropic radiated power (EIRP) levels as devices with fixed panels that rely on electrically steerable beams. FIG. 6 is a diagram 600 illustrating an example of a wireless device with mechanically displaceable (or movable) antenna panels in accordance with various aspects of the present disclosure. As shown in FIG. 6, UE 602 may include two antenna panels: panel 1 612 and panel 2 614. At least one of these two antenna panels may be mechanically displaceable (or movable) panels. For example, panel 2 614 may be moved to a new position at 614' using a mechanical rotation mechanism 620. In some examples, the two antenna panels (e.g., panel 1 612 and panel 2 614) in UE 602 may initially be co-located panels, meaning they are positioned together in the same physical location as UE 602. In some examples, due to the movement of one or both of these antenna panels, these two antenna panels (e.g., panel 1 612 and panel 2 at a new location 614') may become non-co-located panels, meaning they are physically separated and positioned at different locations as UE 602.

The mobility of antenna panels (e.g., the mechanical rotation mechanism 620 of panel 2 614) introduces challenges in predicting useful beams accurately and robustly. This is because of the lack of precise knowledge about the current positions of the antenna panels (e.g., panel 2 614). Several factors contribute to this uncertainty, such as the motors controlling the panels operating slower than expected or experiencing partial failure due to ageing or other factors. Example aspects presented herein provide methods and apparatuses for UE-initiated beam management based on a new triggering event of antenna/panel displacement being above the threshold distance.

Figure 7:
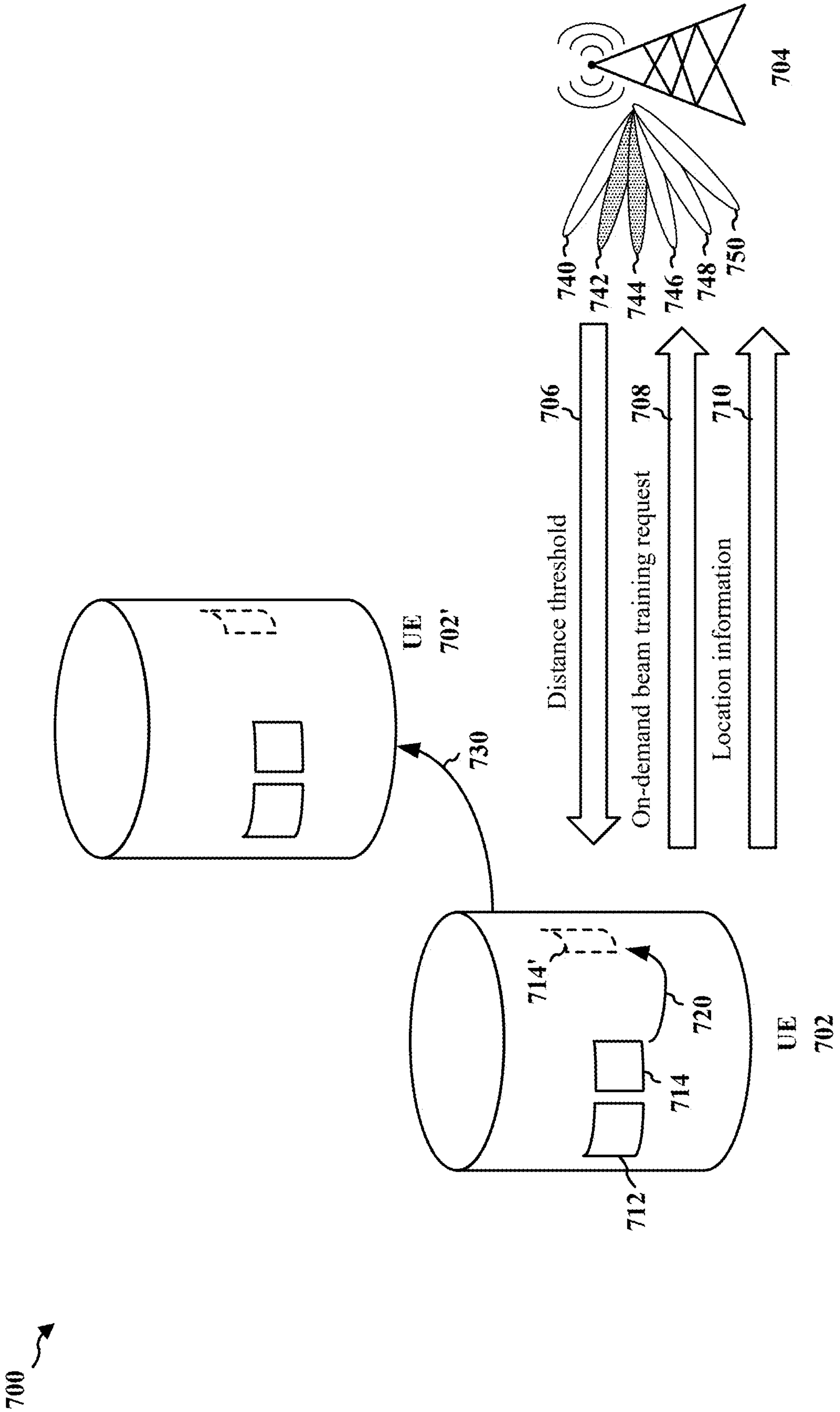
FIG. 7 is a diagram illustrating an example of an on-demand beam training session in accordance with various aspects of the present disclosure.

FIG. 7 is a diagram 700 illustrating an example of an on-demand beam training session in accordance with various aspects of the present disclosure. As shown in FIG. 7, UE 702 may have mechanically movable antenna panels, such as panel 1 712 and panel 2 714. For example, panel 2 714 may be operated by a mechanism (e.g., a motor) that allows it to move (e.g., along 720) from its current location to a new location at 714'. The UE 702 may request an on-demand beam training session from base station 704 if the mechanical displacement of the antenna panels (e.g., panel 2 714) or intra-device mobility exceeds a configured distance threshold. In some examples, the displacement of an antenna panel, such as panel 2 714, may be determined as the distance between the current location of the antenna panel (e.g., panel 2 714) and its original location prior to the displacement (or movement). In some examples, the displacement of an antenna panel (e.g., panel 2714) may be determined as the relative distance between the current location of the antenna panel (e.g., panel 2 714) and the location of another antenna panel (e.g., panel 1 712) in the device (e.g., UE 702). In some examples, in addition to the intra-device mobility, UE 702 may have device mobility, meaning the UE 702 may move (e.g., along 730 to UE 702') relative to base station 704. In some examples, the mechanical displacement of the antenna panels may be described in terms of a displacement condition. In some examples, if the distance between the current location of an antenna panel (e.g., panel 2 at 714) and its original location prior to the displacement or movement (e.g., the distance between 714' and 714) is greater than the distance threshold, the displacement condition is met. In some examples, if the relative distance between the current location of the antenna panel (e.g., panel 2 714) and the location of another antenna panel (e.g., panel 1 712) in the device (e.g., UE 702) is greater than the threshold, the displacement condition is met. In some examples, the UE 702 may request an on-demand beam training session if the displacement condition has been met.

In some examples, this distance threshold may be configured by the base station (e.g., by base station 704 at 706) and may be used to identify when intra-device mobility (e.g., movement 720 of antenna panel 2 714) has reached a level that necessitates an on-demand beam training (e.g., exceeded the distance threshold). In some examples, if the mechanical displacement (e.g., movement 720 of antenna panel 2 714) remains below the distance threshold, the device (e.g., UE 702) can continue operating with existing beams, avoiding unnecessary beam training sessions. In some examples, this on-demand beam training mechanism can be implemented using specialized signaling configured for devices with mechanically displaceable (or movable) panels, thus creating a new category of devices (e.g., devices that are capable of on-demand beam training). In some examples, this on-demand beam training mechanism may apply to AR, VR, or XR devices that indicate a hardware capability of supporting mechanically displaceable panels.

In some aspects, a device (e.g., UE 702) may not provide additional information about the potential location of its antenna panels when requesting a beam training session. In this scenario, the base station may perform a full beam search (or beam training) to cover the entire possible coverage area of the device (e.g., UE 702). For example, in FIG. 7, if UE 702 sends a beam training request to base station 704 at 708 (e.g., due to the displacement of panel 2 714 exceeds the distance threshold) but does not provide information about the possible location of panel 1 712 or panel 2 714, the base station 704 may perform a full beam search (or beam training) using all the beams (e.g., beam 740, 742, 744, 746, 748, 750) that cover the entire possible coverage area of the UE 702.

In some aspects, to avoid a resource-intensive process for the full beam search (or beam training), a limited beam search (or beam training) approach may be used. In this method, the device (e.g., UE 702) may indicate potential location ranges for its antenna panels, allowing the base station to perform a focused beam search (or beam training) with a limited set of beams using this information. This limited set of beams may cover the potential location ranges indicated by the device (e.g., UE 702). For example, in FIG. 7, if the UE 702 includes location information of its antenna panels (e.g., potential location ranges for panel 2 714) when sending the beam training request at 708 or at a separate occasion 710, the base station 704 may use this information to perform a focused beam search (or beam training) using a limited set of beams, such as beams 742, 744, which cover the potential location ranges of the antenna panels (e.g., panel 2 714). This approach achieves a better balance between beam training overhead and latency, particularly when adapting to the use cases involving low-cost devices.

In some aspects, a device may be able to specify the location range it will occupy in the near future. For example, the device can predict a first future location range at a first time (e.g., one second) from a present time. Then, the device may further predict a second future location range at a second time (e.g., two seconds) from a present time, which may include the predicted first future location range at the first time from a present time, plus a delta (e.g., the positional difference) representing the additional movement expected beyond the predicted first future location range.

In some aspects, the device may use its memory to store beam information from the previous beam training process. For example, the device may store the beams of the base station that provide good performance when the device's beam is steered in a certain direction. Based on the saved beam information, the device may indicate its suitable or favored beams to the base station for a subsequent beam training session, thereby improving the efficiency of the beam training session.

Figure 8:
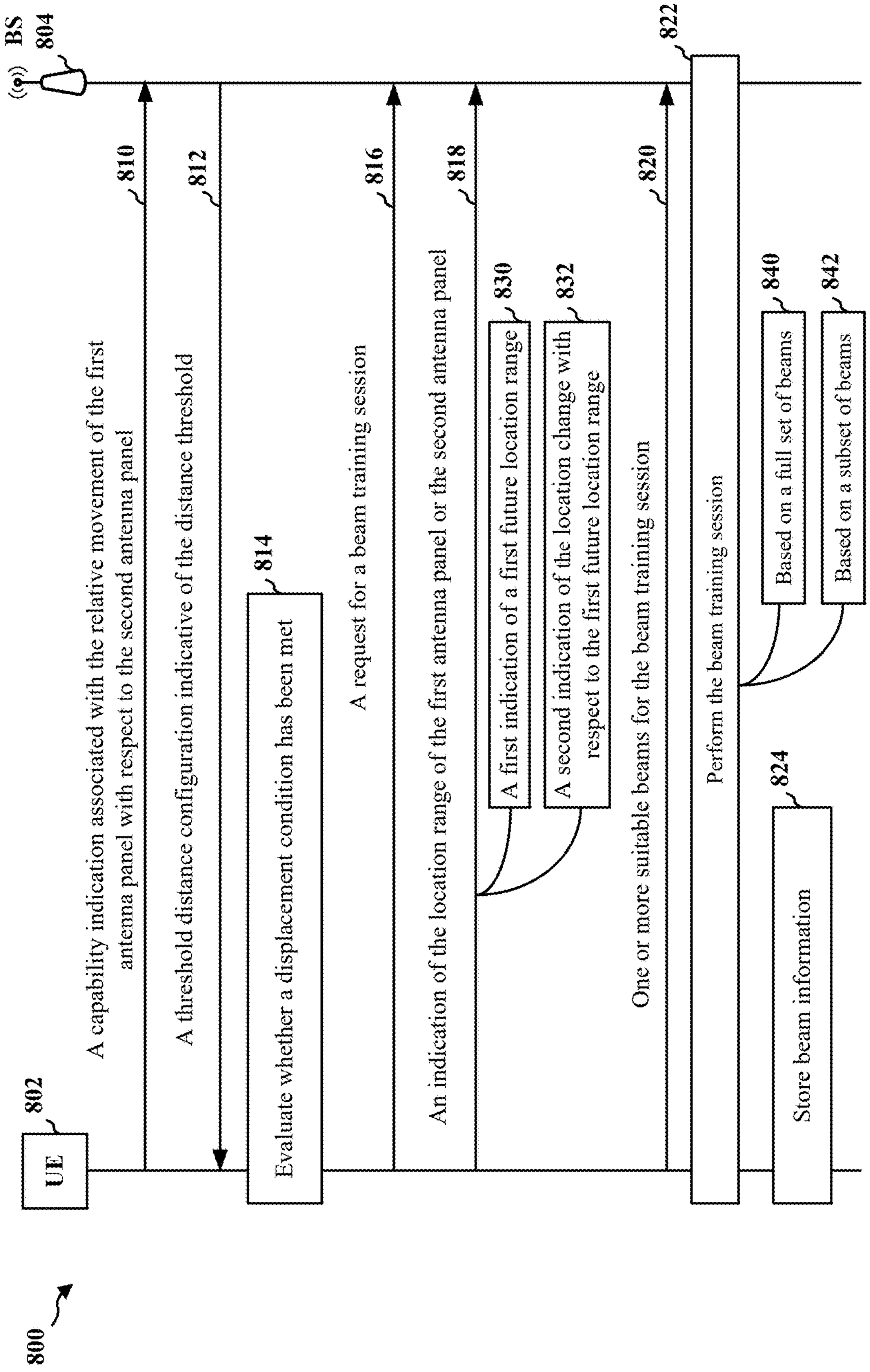
FIG. 8 is a call flow diagram illustrating a method of wireless communication in accordance with various aspects of the present disclosure.

FIG. 8 is a call flow diagram 800 illustrating a method of wireless communication in accordance with various aspects of this present disclosure. Various aspects are described in connection with a UE 802 and a base station 804. The aspects may be performed by the UE 802 or the base station 804 in aggregation and/or by one or more components of a base station 804 (e.g., a CU 110, a DU 130, and/or an RU 140).

As shown in FIG. 8, at 810, the UE 802 may transmit a capability indication to the base station 804. The UE 802 may have mechanical moveable (or displaceable) antenna panels, including the first antenna panel and the second antenna panel, for example. The capability indication may be associated with the relative movement of the first antenna panel with respect to the second antenna panel. For example, the capability indication may indicate the UE's capability to detect the relative movement of the first antenna panel with respect to the second antenna panel.

At 812, the UE 802 may receive a threshold distance configuration that indicates the distance threshold. For example, the threshold distance may be used by the UE to assess the relative movement of the antenna panels and determine whether to initiate a beam training session (e.g., at 814) based on the relative movement.

At 814, the UE 802 may evaluate whether a displacement condition has been met. The displacement condition may be associated with the first antenna panel and the second antenna panel of the UE. In some examples, the displacement condition being met may indicate that a relative movement of the first antenna panel with respect to the second antenna panel is greater than the distance threshold. For example, if the relative movement of the first antenna panel with respect to the second antenna panel is greater than the distance threshold (e.g., the distance threshold received at 812), the displacement condition is met.

At 816, the UE 802 may transmit a request for a beam training session to base station 804. For example, the UE 802 may transmit the request when the displacement condition has been met.

At 818, the UE 802 may further transmit to base station 804 an indication of the location range of the first antenna panel or the second antenna panel to facilitate the beam training session at 822. In some examples, to transmit the indication of the location range, the UE 802 may transmit a location indication of one or more future location ranges of the first antenna panel or the second antenna panel corresponding to one or more future time instances. For example, the UE 802 may transmit a first indication of a first future location range of the first antenna panel or the second antenna panel at a first future time instance. The UE 802 may then transmit a second indication of a location change with respect to the first future location range of the first antenna panel or the second antenna panel at a second future time instance. The second future time instance may be after the first future time instance.

In some examples, at 818, the UE 802 may transmit a location indication of one or more future location ranges of the first antenna panel or the second antenna panel corresponding to one or more future time instances. In some examples, the UE 802 may transmit the location indication for one future location range of the first antenna panel or the second antenna panel corresponding one future time instance. In some examples, the UE 802 may transmit the location indication for multiple future location ranges of the first antenna panel or the second antenna panel respectively corresponding multiple future time instances. For example, the UE 802 may first, at 830, transmit a first indication of a first future location range of the first antenna panel or the second antenna panel at a first future time instance. Then, for a second future time instance that is after the first future time instance, the UE 802 may transmit, at 832, a second indication of the location change with respect to the first future location range for the first antenna panel or the second antenna panel at the second future time instance.

At 820, the UE 802 may further indicate one or more suitable beams for the beam training session (e.g., at 822) to base station 804. In some examples, the suitable beams may correspond to the location range of the first antenna panel or the second antenna panel. In some examples, the suitable beams may include the beams in previous beam training sessions that the UE has stored (e.g., at 824).

At 822, the UE 802 and base station 804 may perform the beam training session. In some examples, the beam training session may be initiated by the UE 802 when the UE 802 detects that the displacement condition (e.g., at 814) has been met (e.g., the relative movement of the first antenna panel with respect to the second antenna panel is greater than the distance threshold).

In some examples, if the UE 802 has not indicated the location range of the first antenna panel or the second antenna panel to base station 804, the UE 802 and base station 804 may perform the beam training session using a full set of beams of base station 804 (e.g., at 840). The full set of beams may cover a first set of possible coverage areas for the first antenna panel or a second set of possible coverage areas for the second antenna panel. For example, referring to FIG. 7 and FIG. 8, if the UE 702 does not indicate the location range of its antenna panels (e.g., panel 1 712 or panel 2 714) when sending the request for a beam training session, the base station 804 may perform the beam training session using a full set of beams (e.g., beam 740, 742, 744, 746, 748, 750) at 840. The full set of beams may cover a first set of possible coverage areas for the first antenna panel (e.g., panel 1 712) or a second set of possible coverage areas for the second antenna panel (e.g., panel 2 714).

In some examples, if the UE 802 has indicated one or more location ranges of the first antenna panel or the second antenna panel (e.g., at 818), the UE 802 and base station 804 may perform the beam training session using a subset of beams of base station 804 that covers the one or more location ranges (e.g., at 842). For example, in FIG. 7, if the UE 702 has indicated one or more location ranges of the antenna panels (e.g., at 710), the base station 704 may perform the beam training session using a limited set of beams, such as beam 742, 744 that cover the one or more location ranges of the antenna panels.

At 824, the UE 802 may store beam information for the beam training session. For example, the beam information may include one or more suitable beams corresponding to the location range of the first antenna panel or the second antenna panel during the beam training session (e.g., at 822). For example, the stored beam information, such as the suitable beams corresponding to the location range, may be used in a subsequent beam training session to expedite the beam training process.

Figure 9:
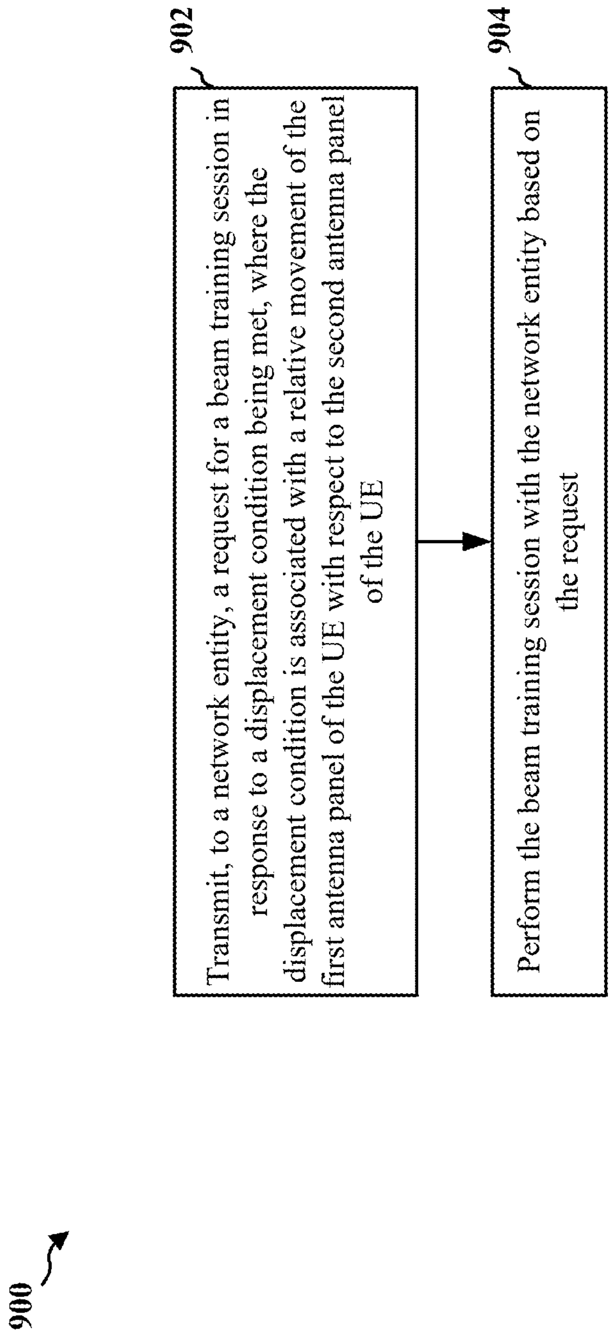
FIG. 9 is a flowchart illustrating methods of wireless communication at a UE in accordance with various aspects of the present disclosure.

FIG. 9 is a flowchart 900 illustrating methods of wireless communication at a UE in accordance with various aspects of the present disclosure. The method may be performed by a UE in collaboration with a network entity. The network entity may be a base station, or a component of a base station, in the access network of FIG. 1 or a core network component (e.g., base station 102, 310, 704, 804; or the network entity 1102 in the hardware implementation of FIG. 11). The UE may be the UE 104, 350, 702, 802, or the apparatus 1104 in the hardware implementation of FIG. 11. By providing an efficient and adaptive solution for UE-initiated on-demand beam training for devices with mechanically movable antenna panels, the methods address the uncertainties associated with antenna panel positioning and user mobility, thereby enhancing communication reliability. Additionally, by enabling the UE to signal potential location ranges of antenna panels and thereby narrowing the beam search space for the base station, the methods reduce the computational overhead and time needed for beam training sessions, improving the overall efficiency of wireless communication. In some aspects, by allowing UE to store and utilize historical beam training data, the methods reduce redundancy and further optimize the beam training process.

As shown in FIG. 9, at 902, the UE may transmit, to a network entity, a request for a beam training session in response to a displacement condition being met. The displacement condition may be associated with a relative movement of the first antenna panel of the UE with respect to the second antenna panel of the UE. FIG. 4, FIG. 5, FIG. 6, FIG. 7, and FIG. 8 illustrate various aspects of the steps in connection with flowchart 900. For example, referring to FIG. 7 and FIG. 8, the UE 802 may, at 816, transmit, to a network entity (e.g., base station 804), a request for a beam training session when a displacement condition has been met. The displacement condition may be associated with a first antenna panel (e.g., panel 1 712) of the UE (e.g., UE 702) and a second antenna panel (e.g., panel 2 714) of the UE (e.g., UE 702). In some aspects, 902 may be performed by the beam training component 198.

At 904, the UE may perform the beam training session with the network entity based on the request. For example, referring to FIG. 8, the UE 802 may, at 822, perform the beam training session with the network entity (e.g., base station 804) based on the request (at 816). In some aspects, 904 may be performed by the beam training component 198.

In some aspects, the displacement condition being met may indicate that the relative movement of the first antenna panel with respect to the second antenna panel is greater than a distance threshold. For example, referring to FIG. 7, the displacement condition being met may indicate that the relative movement of the first antenna panel (e.g., panel 1 712) with respect to the second antenna panel (e.g., panel 2 714) is greater than a distance threshold.

In some aspects, the UE may receive, from the network entity, a threshold distance configuration indicative of the distance threshold. For example, referring to FIG. 7, the UE 702 may, at 706, receive from the network entity (e.g., base station 704) the distance threshold. Referring to FIG. 8, the UE 802 may, at 812, receive from the network entity (e.g., base station 804) a threshold distance configuration indicative of the distance threshold.

In some aspects, the UE may transmit, to the network entity, a capability indication associated with the relative movement of the first antenna panel with respect to the second antenna panel. For example, referring to FIG. 8, the UE 802 may, at 810, transmit to the network entity (e.g., base station 804) a capability indication. Referring to FIG. 7, the capability indication may indicate that the UE 702 includes mechanically displaceable (or moveable) antenna panels (e.g., panel 1 712 and panel 2 714), and there may be a relative movement between these antenna panels (e.g., between panel 1 712 and panel 2 714).

In some aspects, to perform the beam training session (e.g., at 904), the UE may perform the beam training session with a full set of beams of the network entity covering a first set of possible coverage areas for the first antenna panel or a second set of possible coverage areas for the second antenna panel. For example, referring to FIG. 7, the UE 702 may perform the beam training session with a full set of beams (e.g., beam 740, 742, 744, 746, 748, 750) of the network entity (e.g., base station 704). The full set of beams (e.g., beam 740, 742, 744, 746, 748, 750) may cover a first set of possible coverage areas for the first antenna panels of UE 702 (e.g., panel 1 712) or a second set of possible coverage areas for the second antenna panel of the UE 702 (e.g., panel 2 714). Referring to FIG. 8, the UE 802 may perform the beam training session with a full set of beams (e.g., at 840) of the network entity (e.g., base station 804) that cover possible coverage areas of the antenna panels of UE 802.

In some aspects, the UE may transmit, to the network entity, an indication of a location range of the first antenna panel or the second antenna panel. To perform the beam training session (e.g., at 904), the UE may perform the beam training session based on the location range of the first antenna panel or the second antenna panel. For example, referring to FIG. 8, the UE 802 may, at 818, transmit to the network entity (e.g., base station 804) an indication of the location range of the first antenna panel or the second antenna panel. The UE 802 may, at 822, perform the beam training session based on the location range of the first antenna panel or the second antenna panel.

In some aspects, to perform the beam training session based on the location range, the UE may perform the beam training session with the network entity using a subset of beams in a full set of beams of the network entity. The subset of beams may cover the location range of the first antenna panel or the second antenna panel. For example, referring to FIG. 7 and FIG. 8, the UE 702 may perform the beam training session with the network entity (e.g., base station 704) using a subset of beams at 842 (e.g., beams 742, 744) in a full set of beams of the network entity (e.g., base station 704). The subset of beams (e.g., beams 742, 744) may cover the location range of the first antenna panel (e.g., panel 1 712) or the second antenna panel (e.g., panel 2 714).

In some aspects, to transmit the indication of the location range of the first antenna panel or the second antenna panel, the UE may transmit a location indication of one or more future location ranges of the first antenna panel or the second antenna panel corresponding to one or more future time instances. For example, referring to FIG. 7 and FIG. 8, the UE 802 may, at 818, transmit a location indication of one or more future location ranges of the first antenna panel (e.g., panel 1 712) or the second antenna panel (e.g., panel 2 714) corresponding to one or more future time instances.

In some aspects, to transmit the location indication of the one or more future location ranges of the first antenna panel or the second antenna panel corresponding to the one or more future time instances, the UE may transmit a first indication a first future location range of the first antenna panel or the second antenna panel at a first future time instance; and transmit a second indication of a location change with respect to the first future location range of the first antenna panel or the second antenna panel at a second future time instance. The second future time instance may be after the first future time instance. For example, referring to FIG. 7 and FIG. 8, the UE 802 may, at 818, transmit a first indication (e.g., at 830) of a first future location range of the first antenna panel (e.g., panel 1 712) or the second antenna panel (e.g., panel 2 714) at a first future time instance; and transmit a second indication (e.g., at 840) of a location change with respect to the first future location range of the first antenna panel (e.g., panel 1 712) or the second antenna panel (e.g., panel 2 714) at a second future time instance after the first future time instance.

In some aspects, the UE may transmit, to the network entity, one or more suitable beams for the beam training session corresponding to the location range of the first antenna panel or the second antenna panel. For example, referring to FIG. 7 and FIG. 8, the UE 802 may, at 820, transmit to the network entity (e.g., base station 804) one or more suitable beams for the beam training session corresponding to the location range of the first antenna panel (e.g., panel 1 712) or the second antenna panel (e.g., panel 2 714).

In some aspects, the UE may store beam information for the one or more suitable beams corresponding to the location range of the first antenna panel or the second antenna panel. For example, referring to FIG. 8, the UE 802 may, at 824, store beam information for the one or more suitable beams corresponding to the location range of the first antenna panel or the second antenna panel.

Figure 10:
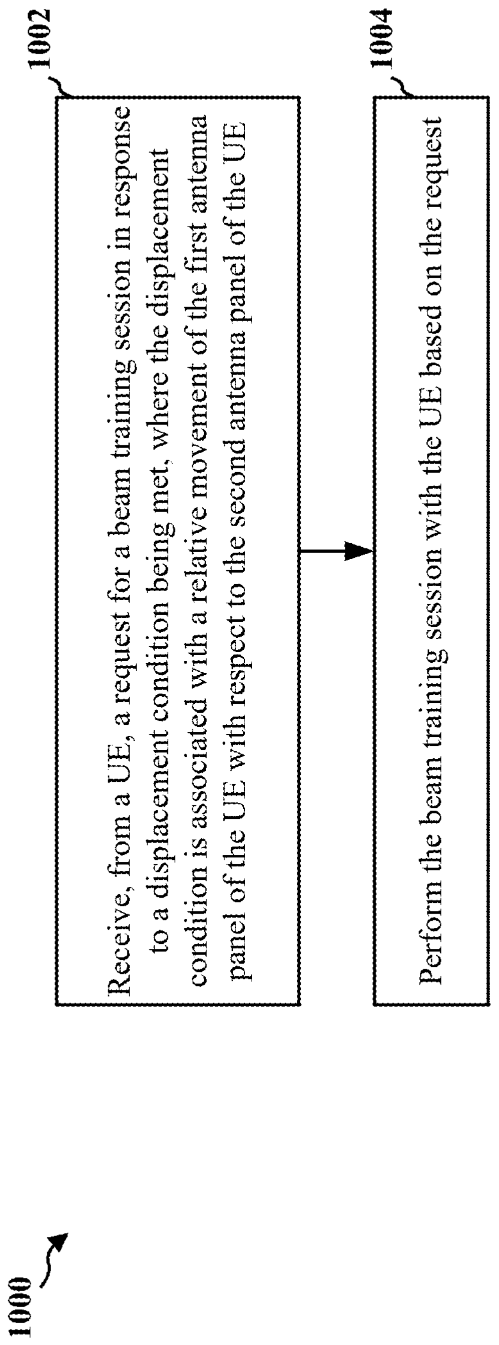
FIG. 10 is a flowchart illustrating methods of wireless communication at a network entity in accordance with various aspects of the present disclosure.

FIG. 10 is a flowchart 1000 illustrating methods of wireless communication at a network entity in accordance with various aspects of the present disclosure. The method may be performed by a network entity in collaboration with a UE. The network entity may be a base station, or a component of a base station, in the access network of FIG. 1 or a core network component (e.g., base station 102, 310, 704, 804; or the network entity 1102 in the hardware implementation of FIG. 11). The UE may be the UE 104, 350, 702, 802, or the apparatus 1104 in the hardware implementation of FIG. 11. By providing an efficient and adaptive solution for UE-initiated on-demand beam training for devices with mechanically movable antenna panels, the methods address the uncertainties associated with antenna panel positioning and user mobility, thereby enhancing communication reliability. Additionally, by enabling the UE to signal potential location ranges of antenna panels and thereby narrowing the beam search space for the base station, the methods reduce the computational overhead and time needed for beam training sessions, improving the overall efficiency of wireless communication. In some aspects, by allowing UE to store and utilize historical beam training data, the methods reduce redundancy and further optimize the beam training process.

As shown in FIG. 10, at 1002, the network entity may receive, from a UE, a request for a beam training session in response to a displacement condition being met. The displacement condition may be associated with a relative movement of a first antenna panel of the UE with respect to a second antenna panel of the UE. FIG. 4, FIG. 5, FIG. 6, FIG. 7, and FIG. 8 illustrate various aspects of the steps in connection with flowchart 1000. For example, referring to FIG. 7 and FIG. 8, the network entity (e.g., base station 804) may, at 816, receive from UE 802 a request for a beam training session in response to a displacement condition being met. The displacement condition may be associated with a relative movement of a first antenna panel (e.g., panel 1 712) and a second antenna panel (e.g., panel 2 714) of the UE 702. In some aspects, 1002 may be performed by the beam training component 199.

At 1004, the network entity may perform the beam training session with the UE based on the request. For example, referring to FIG. 8, the network entity (e.g., base station 804) may, at 822, perform the beam training session with the UE 802 based on the request (e.g., at 816). In some aspects, 1004 may be performed by the beam training component 199.

In some aspects, the displacement condition being met may indicate that the relative movement of the first antenna panel with respect to the second antenna panel is greater than a distance threshold. For example, referring to FIG. 7, the displacement condition being met may indicate that the relative movement of the first antenna panel (e.g., panel 1 712) with respect to the second antenna panel (e.g., panel 2 714) is greater than a distance threshold.

In some aspects, the network entity may transmit, to the UE, a threshold distance configuration indicative of the distance threshold. For example, referring to FIG. 7, the network entity (e.g., base station 704) may, at 706, transmit to the UE 702 the distance threshold. Referring to FIG. 8, the network entity (e.g., base station 804) may, at 812, transmit to the UE 802 a threshold distance configuration indicative of the distance threshold.

In some aspects, the network entity may receive, from the UE, a capability indication associated with the relative movement of the first antenna panel with respect to the second antenna panel. For example, referring to FIG. 8, the network entity (e.g., base station 804) may, at 810, receive from the UE 802 a capability indication associated with the relative movement of the first antenna panel with respect to the second antenna panel. Referring to FIG. 7, the capability indication may indicate that the UE 702 includes mechanically displaceable (or moveable) antenna panels (e.g., panel 1 712 and panel 2 714), and there may be a relative movement between these antenna panels (e.g., between panel 1 712 and panel 2 714).

In some aspects, to perform the beam training session (e.g., at 1004), the network entity may perform the beam training session with a full set of beams of the network entity covering a first set of possible coverage areas of the first antenna panel or a second set of possible coverage areas of the second antenna panel of the UE. For example, referring to FIG. 7, the network entity (e.g., base station 704) may perform the beam training session with a full set of beams (e.g., beam 740, 742, 744, 746, 748, 750) of the network entity (e.g., base station 704) that cover a first set of possible coverage areas of the first antenna panel of UE 702 (e.g., panel 1 712) and a second set of possible coverage areas of the second antenna panel of UE 702 (e.g., panel 2 714). Referring to FIG. 8, the network entity (e.g., base station 804) may perform the beam training session with a full set of beams (e.g., at 840) of the network entity (e.g., base station 804) that cover possible coverage areas of the antenna panels of UE 802.

In some aspects, the network entity may receive, from the UE, an indication of a location range of the first antenna panel or the second antenna panel. To perform the beam training session (e.g., at 1004), the network entity may perform the beam training session based on the location range of the first antenna panel or the second antenna panel. For example, referring to FIG. 7 and FIG. 8, the network entity (e.g., base station 804) may, at 818, receive from the UE 802 an indication of a location range of the first antenna panel (e.g., panel 1 712) or the second antenna panel (e.g., panel 2 714). To perform the beam training session (e.g., at 822), the network entity (e.g., base station 804) may perform the beam training session based on the location range of the first antenna panel (e.g., panel 1 712) or the second antenna panel (e.g., panel 2 714).

In some aspects, to perform the beam training session based on the location range, the network entity may perform the beam training session with the UE using a subset of beams in a full set of beams of the network entity. The subset of beams may cover the location range of the first antenna panel or the second antenna panel. For example, referring to FIG. 7, the network entity (e.g., base station 704) may perform the beam training session with the UE 702 using a subset of beams (e.g., beam 742, 744) in a full set of beams of the network entity (e.g., base station 704). The subset of beams may cover the location range of the first antenna panel (e.g., panel 1 712) or the second antenna panel (e.g., panel 2 714).

In some aspects, to receive the indication of the location range of the first antenna panel or the second antenna panel, the network entity may receive a location indication of one or more future location ranges of the first antenna panel or the second antenna panel corresponding to one or more future time instances. For example, referring to FIG. 7 and FIG. 8, the network entity (e.g., base station) may, at 818, receive the location indication of one or more future location ranges of the first antenna panel (e.g., panel 1 712) or the second antenna panel (e.g., panel 2 714) corresponding to one or more future time instances.

In some aspects, to receive the location indication of one or more future location ranges of the first antenna panel or the second antenna panel corresponding to the one or more future time instances, the network entity may receive a first indication of a first future location range of the first antenna panel or the second antenna panel at a first future time instance; and receive a second indication of a location change with respect to the first future location range of the first antenna panel or the second antenna panel at a second future time instance after the first future time instance. For example, referring to FIG. 7 and FIG. 8, the network entity (e.g., base station 804) may, at 818, receive a first indication of a first future location range of the first antenna panel (e.g., panel 1 712) or the second antenna panel (e.g., panel 2714) at a first future time instance; and receive a second indication of a location change with respect to the first future location range of the first antenna panel (e.g., panel 1 712) or the second antenna panel (e.g., panel 2 714) at a second future time instance after the first future time instance.

In some aspects, the network entity may receive, from the UE, one or more suitable beams for the beam training session corresponding to the location range of the first antenna panel or the second antenna panel. For example, referring to FIG. 7 and FIG. 8, the network entity (e.g., base station 804) may, at 820, receive from the UE 802 one or more suitable beams for the beam training session corresponding to the location range of the first antenna panel (e.g., panel 1 712) or the second antenna panel (e.g., panel 2 714).

Figure 11:
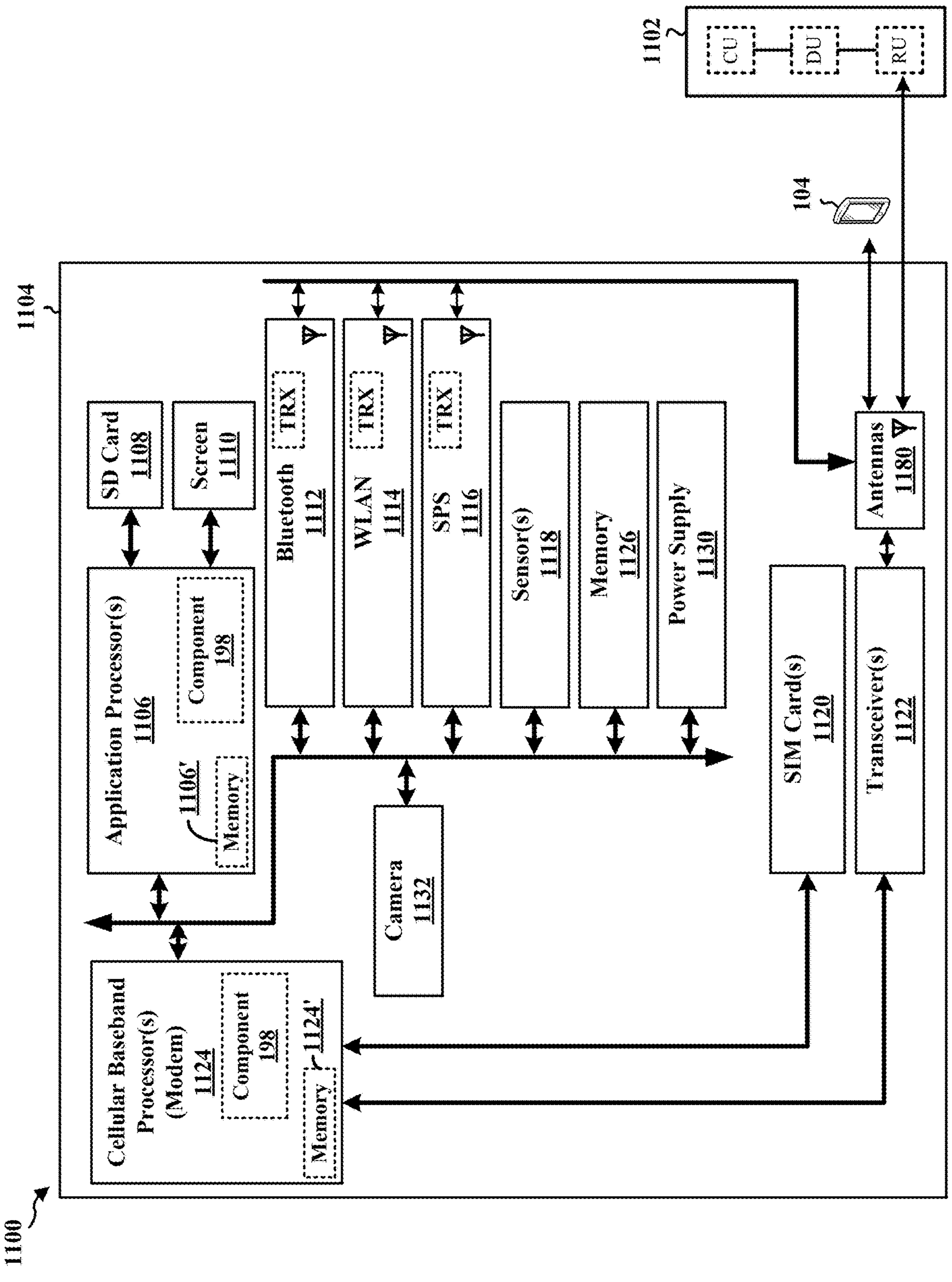
FIG. 11 is a diagram illustrating an example of a hardware implementation for an example apparatus and/or UE.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include at least one cellular baseband processor (or processing circuitry) 1124 (also referred to as a modem) coupled to one or more transceivers 1122 (e.g., cellular RF transceiver). The cellular baseband processor(s) (or processing circuitry) 1124 may include at least one on-chip memory (or memory circuitry) 1124'. In some aspects, the apparatus 1104 may further include one or more subscriber identity modules (SIM) cards 1120 and at least one application processor (or processing circuitry) 1106 coupled to a secure digital (SD) card 1108 and a screen 1110. The application processor(s) (or processing circuitry) 1106 may include on-chip memory (or memory circuitry) 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor(s) (or processing circuitry) 1124 communicates through the transceiver(s) 1122 via one or more antennas 1180 with the UE 104 and/or with an RU associated with a network entity 1102. The cellular baseband processor(s) (or processing circuitry) 1124 and the application processor(s) (or processing circuitry) 1106 may each include a computer-readable medium/memory (or memory circuitry) 1124', 1106', respectively. The additional memory modules 1126 may also be considered a computer-readable medium/memory (or memory circuitry). Each computer-readable medium/memory (or memory circuitry) 1124', 1106', 1126 may be non-transitory. The cellular baseband processor(s) (or processing circuitry) 1124 and the application processor(s) (or processing circuitry) 1106 are each responsible for general processing, including the execution of software stored on the computer-readable medium/memory (or memory circuitry). The software, when executed by the cellular baseband processor(s) (or processing circuitry) 1124/application processor(s) (or processing circuitry) 1106, causes the cellular baseband processor(s) (or processing circuitry) 1124/application processor(s) (or processing circuitry) 1106 to perform the various functions described supra. The cellular baseband processor(s) (or processing circuitry) 1124 and the application processor(s) (or processing circuitry) 1106 are configured to perform the various functions described supra based at least in part of the information stored in the memory (or memory circuitry). That is, the cellular baseband processor(s) (or processing circuitry) 1124 and the application processor(s) (or processing circuitry) 1106 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor(s) (or processing circuitry) 1124/application processor(s) (or processing circuitry) 1106 when executing software. The cellular baseband processor(s) (or processing circuitry) 1124/application processor(s) (or processing circuitry) 1106 may be a component of the UE 350 and may include the at least one memory 360 and/or at least one of the TX processor 368, the RX processor 356, and the controller/processor 359. In one configuration, the apparatus 1104 may be at least one processor chip (modem and/or application) and include just the cellular baseband processor(s) (or processing circuitry) 1124 and/or the application processor(s) (or processing circuitry) 1106, and in another configuration, the apparatus 1104 may be the entire UE (e.g., see UE 350 of FIG. 3) and include the additional modules of the apparatus 1104.

As discussed supra, the component 198 may be configured to transmit, to a network entity, a request for a beam training session in response to a displacement condition being met, where the displacement condition is associated with a relative movement of the first antenna panel of the UE with respect to the second antenna panel of the UE; and perform the beam training session with the network entity based on the request. The component 198 may be further configured to perform any of the aspects described in connection with the flowchart in FIG. 9, and/or performed by the UE 802 in FIG. 8. The component 198 may be within the cellular baseband processor(s) (or processing circuitry) 1124, the application processor(s) (or processing circuitry) 1106, or both the cellular baseband processor(s) (or processing circuitry) 1124 and the application processor(s) (or processing circuitry) 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1104 may include a variety of components configured for various functions. In one configuration, the apparatus 1104, and in particular the cellular baseband processor(s) (or processing circuitry) 1124 and/or the application processor(s) (or processing circuitry) 1106, includes means for transmitting, to a network entity, a request for a beam training session in response to a displacement condition being met, where the displacement condition is associated with a relative movement of the first antenna panel of the UE with respect to the second antenna panel of the UE; and means for performing the beam training session with the network entity based on the request. The apparatus 1104 may further include means for performing any of the aspects described in connection with the flowchart in FIG. 9, and/or aspects performed by the UE 802 in FIG. 8. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
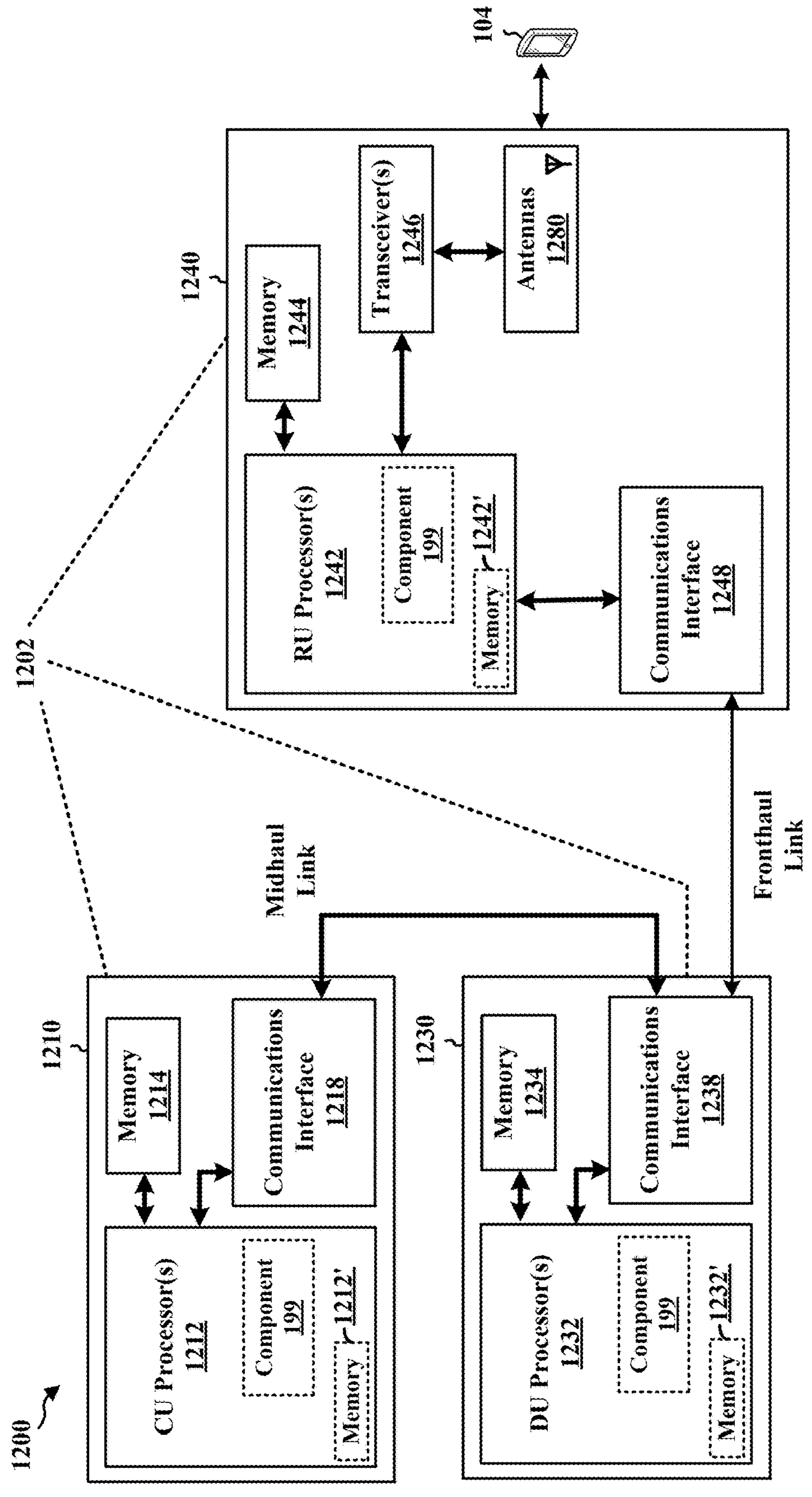
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include at least one CU processor (or processing circuitry) 1212. The CU processor(s) (or processing circuitry) 1212 may include on-chip memory (or memory circuitry) 1212'. In some aspects, the CU 1210 may further include additional memory modules 1214 and a communications interface 1218. The CU 1210 communicates with the DU 1230 through a midhaul link, such as an F1 interface. The DU 1230 may include at least one DU processor (or processing circuitry) 1232. The DU processor(s) (or processing circuitry) 1232 may include on-chip memory (or memory circuitry) 1232'. In some aspects, the DU 1230 may further include additional memory modules 1234 and a communications interface 1238. The DU 1230 communicates with the RU 1240 through a fronthaul link. The RU 1240 may include at least one RU processor (or processing circuitry) 1242. The RU processor(s) (or processing circuitry) 1242 may include on-chip memory (or memory circuitry) 1242'. In some aspects, the RU 1240 may further include additional memory modules 1244, one or more transceivers 1246, antennas 1280, and a communications interface 1248. The RU 1240 communicates with the UE 104. The on-chip memory (or memory circuitry) 1212', 1232', 1242' and the additional memory modules 1214, 1234, 1244 may each be considered a computer-readable medium/memory (or memory circuitry). Each computer-readable medium/memory (or memory circuitry) may be non-transitory. Each of the processors (or processing circuitry) 1212, 1232, 1242 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to receive, from a UE, a request for a beam training session in response to a displacement condition being met, where the displacement condition is associated with a relative movement of the first antenna panel of the UE with respect to the second antenna panel of the UE; and perform the beam training session with the UE based on the request. The component 199 may be further configured to perform any of the aspects described in connection with the flowchart in FIG. 10, and/or performed by the base station 804 in FIG. 8. The component 199 may be within one or more processors (or processing circuitry) of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1202 may include a variety of components configured for various functions. In one configuration, the network entity 1202 includes means for receiving, from a UE, a request for a beam training session in response to a displacement condition being met, where the displacement condition is associated with a relative movement of the first antenna panel of the UE with respect to the second antenna panel of the UE; and means for performing the beam training session with the UE based on the request. The network entity 1202 may further include means for performing any of the aspects described in connection with the flowchart in FIG. 10, and/or aspects performed by the base station 804 in FIG. 8. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include transmitting, to a network entity, a request for a beam training session in response to a displacement condition being met, where the displacement condition is associated with a relative movement of the first antenna panel of the UE with respect to the second antenna panel of the UE; and performing the beam training session with the network entity based on the request. By providing an efficient and adaptive solution for UE-initiated on-demand beam training for devices with mechanically movable antenna panels, the methods address the uncertainties associated with antenna panel positioning and user mobility, thereby enhancing communication reliability. Additionally, by enabling the UE to signal potential location ranges of antenna panels and thereby narrowing the beam search space for the base station, the methods reduce the computational overhead and time needed for beam training sessions, improving the overall efficiency of wireless communication. In some aspects, by allowing UE to store and utilize historical beam training data, the methods reduce redundancy and further optimize the beam training process.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor (i.e., a set of one or more processor P) is configured to perform a set of functions F, each processor of P may be configured to perform a subset S of F, where $S \subset F$. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes transmitting, to a network entity, a request for a beam training session in response to a displacement condition being met, wherein the displacement condition is associated with a relative movement of a first antenna panel of the UE with respect to a second antenna panel of the UE; and performing, based on the request, the beam training session with the network entity.

Aspect 2 is the method of aspect 1, wherein the displacement condition being met indicates that the relative movement of the first antenna panel with respect to the second antenna panel is greater than a distance threshold.

Aspect 3 is the method of any of aspects 1 to 2, where the method further includes receiving, from the network entity, a threshold distance configuration indicative of the distance threshold.

Aspect 4 is the method of any of aspects 1 to 2, where the method further includes transmitting, to the network entity, a capability indication associated with the relative movement of the first antenna panel with respect to the second antenna panel.

Aspect 5 is the method of any of aspects 1 to 2, wherein performing the beam training session comprises: performing the beam training session with a full set of beams of the network entity covering a first set of possible coverage areas for the first antenna panel or a second set of possible coverage areas for the second antenna panel.

Aspect 6 is the method of any of aspects 1 to 2, where the method further includes: transmitting, to the network entity, an indication of a location range of the first antenna panel or the second antenna panel, wherein performing the beam training session comprises: performing the beam training session based on the location range of the first antenna panel or the second antenna panel.

Aspect 7 is the method of aspect 6, wherein performing the beam training session based on the location range comprises: performing the beam training session with the network entity using a subset of beams in a full set of beams for the network entity, wherein the subset of beams covers the location range of the first antenna panel or the second antenna panel.

Aspect 8 is the method of aspect 6, wherein transmitting the indication of the location range of the first antenna panel or the second antenna panel comprises: transmitting a location indication of one or more future location ranges of the first antenna panel or the second antenna panel corresponding to one or more future time instances.

Aspect 9 is the method of aspect 8, wherein transmitting the location indication of the one or more future location ranges of the first antenna panel or the second antenna panel corresponding to the one or more future time instances comprises: transmitting a first indication of a first future location range of the first antenna panel or the second antenna panel at a first future time instance; and transmitting a second indication of a location change with respect to the first future location range of the first antenna panel or the second antenna panel at a second future time instance, wherein the second future time instance is after the first future time instance.

Aspect 10 is the method of any of aspects 6 to 9, where the method further includes transmitting, to the network entity, one or more suitable beams for the beam training session corresponding to the location range of the first antenna panel or the second antenna panel.

Aspect 11 is the method of aspect 10, where the method further includes storing beam information for the one or more suitable beams corresponding to the location range of the first antenna panel or the second antenna panel.

Aspect 12 is an apparatus for wireless communication at a UE, comprising: a processing system that includes processor circuitry and memory circuitry that stores code and is coupled with the processor circuitry, the processing system configured to cause the UE to perform the method of one or more of aspects 1-11.

Aspect 13 is an apparatus for wireless communication at a UE, comprising: at least one memory; and at least one processor coupled to the at least one memory and, where the at least one processor is configured to perform the method of any of aspects 1-11.

Aspect 14 is the apparatus for wireless communication at a UE, comprising means for performing each step in the method of any of aspects 1-11.

Aspect 15 is an apparatus of any of aspects 12-14, further comprising a transceiver configured to receive or to transmit in association with the method of any of aspects 1-11.

Aspect 16 is a computer-readable medium (e.g., a non-transitory computer-readable medium) storing computer executable code at a UE, the code when executed by at least one processor causes the at least one processor to perform the method of any of aspects 1-11.

Aspect 17 is a method of wireless communication at a network entity. The method includes receiving, from a user equipment (UE), a request for a beam training session in response to a displacement condition being met, wherein the displacement condition is associated with a relative movement of the first antenna panel of the UE with respect to a second antenna panel of the UE; and performing, based on the request, the beam training session with the UE.

Aspect 18 is the method of aspect 17, wherein the displacement condition being met indicates that the relative movement of the first antenna panel with respect to the second antenna panel is greater than a distance threshold.

Aspect 19 is the method of any of aspects 17 to 18, where the method further includes transmitting, to the UE, a threshold distance configuration indicative of the distance threshold.

Aspect 20 is the method of any of aspects 17 to 18, where the method further includes receiving, from the UE, a capability indication associated with the relative movement of the first antenna panel with respect to the second antenna panel.

Aspect 21 is the method of any of aspects 17 to 18, wherein performing the beam training session comprises: performing the beam training session with a full set of beams of the network entity covering a first set of possible coverage areas for the first antenna panel or a second set of possible coverage areas for the second antenna panel.

Aspect 22 is the method of any of aspects 17 to 18, where the method further includes receiving, from the UE, an indication of a location range of the first antenna panel or the second antenna panel, wherein performing the beam training session comprises: performing the beam training session based on the location range of the first antenna panel or the second antenna panel.

Aspect 23 is the method of aspect 22, wherein performing the beam training session based on the location range comprises: performing the beam training session with the UE using a subset of beams in a full set of beams for the network entity, wherein the subset of beams covers the location range of the first antenna panel or the second antenna panel.

Aspect 24 is the method of aspect 22, wherein receiving the indication of the location range of the first antenna panel or the second antenna panel comprises: receiving a location indication of one or more future location ranges of the first antenna panel or the second antenna panel corresponding to one or more future time instances.

Aspect 25 is the method of aspect 24, wherein receiving the location indication of the one or more future location ranges of the first antenna panel or the second antenna panel corresponding to the one or more future time instances comprises: receiving a first indication of a first future location range of the first antenna panel or the second antenna panel at a first future time instance; and receiving a second indication of a location change with respect to the first future location range of the first antenna panel or the second antenna panel at a second future time instance, wherein the second future time instance is after the first future time instance.

Aspect 26 is the method of aspect 22, where the method further includes receiving, from the UE, one or more suitable beams for the beam training session corresponding to the location range of the first antenna panel or the second antenna panel.

Aspect 27 is an apparatus for wireless communication at a network entity, comprising: a processing system that includes processor circuitry and memory circuitry that stores code and is coupled with the processor circuitry, the processing system configured to cause the network entity to perform the method of one or more of aspects 17-26.

Aspect 28 is an apparatus for wireless communication at a network entity, comprising: at least one memory; and at least one processor coupled to the at least one memory and, where the at least one processor is configured to perform the method of any of aspects 17-26.

Aspect 29 is the apparatus for wireless communication at a network entity, comprising means for performing each step in the method of any of aspects 17-26.

Aspect 30 is an apparatus of any of aspects 27-29, further comprising a transceiver configured to receive or to transmit in association with the method of any of aspects 17-26.

Aspect 31 is a computer-readable medium (e.g., a non-transitory computer-readable medium) storing computer executable code at a network entity, the code when executed by at least one processor causes the at least one processor to perform the method of any of aspects 17-26.

What is claimed is:

1. An apparatus for wireless communication at a user equipment (UE), comprising:

at least one memory; and at least one processor coupled to the at least one memory and, based at least in part on information stored in the at least one memory, the at least one processor is configured to:

transmit, to a network entity, a request for a beam training session in response to a displacement condition being met, wherein the displacement condition is associated with a relative movement of a first antenna panel of the UE with respect to a second antenna panel of the UE; and perform, based on the request, the beam training session with the network entity.

2. The apparatus of claim 1, further comprising a transceiver coupled to the at least one processor, wherein to transmit the request for the beam training session, the at least one processor is configured to transmit the request for the beam training session via the transceiver, and wherein the displacement condition being met indicates that the relative movement of the first antenna panel with respect to the second antenna panel is greater than a distance threshold.

3. The apparatus of claim 2, wherein the at least one processor is further configured to:

receive, from the network entity, a threshold distance configuration indicative of the distance threshold.

4. The apparatus of claim 2, wherein the at least one processor is further configured to:

transmit, to the network entity, a capability indication associated with the relative movement of the first antenna panel with respect to the second antenna panel.

5. The apparatus of claim 2, wherein to perform the beam training session, the at least one processor is configured to:

perform the beam training session with a full set of beams of the network entity covering a first set of possible coverage areas for the first antenna panel or a second set of possible coverage areas for the second antenna panel.

6. The apparatus of claim 2, wherein the at least one processor is further configured to:

transmit, to the network entity, an indication of a location range of the first antenna panel or the second antenna panel, wherein to perform the beam training session, the at least one processor is configured to:

perform the beam training session based on the location range of the first antenna panel or the second antenna panel.

7. The apparatus of claim 6, wherein to perform the beam training session based on the location range, the at least one processor is configured to:

perform the beam training session with the network entity using a subset of beams in a full set of beams for the network entity, wherein the subset of beams covers the location range of the first antenna panel or the second antenna panel.

8. The apparatus of claim 6, wherein to transmit the indication of the location range of the first antenna panel or the second antenna panel, the at least one processor is configured to:

transmit a location indication of one or more future location ranges of the first antenna panel or the second antenna panel corresponding to one or more future time instances.

9. The apparatus of claim 8, wherein to transmit the location indication of the one or more future location ranges of the first antenna panel or the second antenna panel corresponding to the one or more future time instances, the at least one processor is configured to:

transmit a first indication of a first future location range of the first antenna panel or the second antenna panel at a first future time instance; and transmit a second indication of a location change with respect to the first future location range of the first antenna panel or the second antenna panel at a second future time instance, wherein the second future time instance is after the first future time instance.

10. The apparatus of claim 6, wherein the at least one processor is further configured to:

transmit, to the network entity, one or more suitable beams for the beam training session corresponding to the location range of the first antenna panel or the second antenna panel.

11. The apparatus of claim 10, wherein the at least one processor is further configured to:

store beam information for the one or more suitable beams corresponding to the location range of the first antenna panel or the second antenna panel.

12. An apparatus for wireless communication at a network entity, comprising:

at least one memory; and at least one processor coupled to the at least one memory and, based at least in part on information stored in the at least one memory, the at least one processor is configured to:

receive, from a user equipment (UE), a request for a beam training session in response to a displacement condition being met, wherein the displacement condition is associated with a relative movement of a first antenna panel of the UE with respect to a second antenna panel of the UE; and perform, based on the request, the beam training session with the UE.

13. The apparatus of claim 12, further comprising a transceiver coupled to the at least one processor, wherein to receive the request for the beam training session, the at least one processor is configured to receive the request for the beam training session via the transceiver, wherein the displacement condition being met indicates that the relative movement of the first antenna panel with respect to the second antenna panel is greater than a distance threshold.

14. The apparatus of claim 13, wherein the at least one processor is further configured to:

transmit, to the UE, a threshold distance configuration indicative of the distance threshold.

15. The apparatus of claim 13, wherein the at least one processor is further configured to:

receive, from the UE, a capability indication associated with the relative movement of the first antenna panel with respect to the second antenna panel.

16. The apparatus of claim 13, wherein to perform the beam training session, the at least one processor is configured to:

perform the beam training session with a full set of beams of the network entity covering a first set of possible coverage areas for the first antenna panel or a second set of possible coverage areas for the second antenna panel.

17. The apparatus of claim 13, wherein the at least one processor is further configured to:

receive, from the UE, an indication of a location range of the first antenna panel or the second antenna panel, wherein to perform the beam training session, the at least one processor is configured to:

perform the beam training session based on the location range of the first antenna panel or the second antenna panel.

18. The apparatus of claim 17, wherein to perform the beam training session based on the location range, the at least one processor is configured to:

perform the beam training session with the UE using a subset of beams in a full set of beams for the network entity, wherein the subset of beams covers the location range of the first antenna panel or the second antenna panel.

19. The apparatus of claim 17, wherein the at least one processor is further configured to:

receive, from the UE, one or more suitable beams for the beam training session corresponding to the location range of the first antenna panel or the second antenna panel.

20. A method of wireless communication at a user equipment (UE), comprising:

transmitting, to a network entity, a request for a beam training session in response to a displacement condition being met, wherein the displacement condition is associated with a relative movement of a first antenna panel of the UE with respect to a second antenna panel of the UE; and performing, based on the request, the beam training session with the network entity.

* * * * *